United States Patent Office 2,918,440
Patented Dec. 22, 1959

2,918,440
SYNTHETIC DRYING OILS

Alexander M. Partansky, Concord, Calif., assignor to The Dow Chemical Company, Midland, Mich., a corporation of Delaware No Drawing. Application January 26, 1956
Serial No. 561,660

14 Claims. (Cl. 260—19)

This invention has reference to improved, synthetic drying esters having an oily consistency which are especially suited for providing superior protective film coatings of the type ordinarily obtained with conventional oleoresinous varnishes.

Varnishes, according to the usual traditional conception and practice, are solutions of natural or synthetic resins in drying oils. Their preparation ordinarily involves cooking the resin together with an unsaturated glyceride, or "drying oil" until a uniform solution is obtained having more body than the original oil and which thereby is adapted to form harder films on drying. For purposes of obtaining more uniform compositions that would provide films having better characteristics and improved performance as a protective coating, it would be advantageous for the bodying and hardening substance of a varnish-like vehicle to be in molecular combination with the unsaturated fatty acid chains which "dry" under the influence of atmospheric oxygen, instead of being in the mere physical association provided for by the conventional varnish solutions.

It is, therefore, among the principal objects of the present invention to provide improved synthetic drying oils wherein the resinous constituent is in chemical combination with the drying oil fatty acid constituent. It is a further object of the invention to provide such synthetic drying oils which advantageously are adapted to provide protective film coatings having superior physical properties and chemical resistance, especially with respect to their susceptibility to being affected by caustic and alkali corrodents. It is a particular object to provide such synthetic drying oils which are the esterification product of a drying oil fatty acid and an etherified hydroxy derivative of a phenolformaldehyde novolak resin wherein styrene oxide constitutes at least a portion of the etherifying substituent. It is a primary object of the present invention to provide such synthetic drying oils as are the drying oil fatty acid esterification products of certain poly-(aryl hydroxy alkylene ethers) and mixed poly-(aryl hydroxy alkylene and hydroxy alkyl ethers) of novolaks (herein referred to as polyalcohols or resinous polyalcohols) which are at least partially etherified with styrene oxide and which advantageously are based essentially on the common, tri-functional phenol, $C_6H_5OH$. Additional objects and advantages will be apparent throughout the following description and specification.

According to the present invention, an improved synthetic drying oil is comprised of the esterification product of (1) a resinous polyalcohol consisting of the etherified product of a phenol-formaldehyde novolak which is based essentially on the common, tri-functional phenol, $C_6H_5OH$, and which has from three to ten phenolic units per molecule in which at least a portion of the phenolic hydroxide groups originally present in the molecule are etherified with styrene oxide and (2) carboxylic acids in an amount to provide from about 0.2 to 1.0 and preferably in the neighborhood of about 0.5 carboxyl groups per alcoholic hydroxyl of said resinous polyalcohol, the preponderant amount of such acids being drying oil fatty acids. Advantageously the resinous polyalcohol which is esterified may consist of the etherified product of a phenol-formaldehyde novolak of the indicated type with styrene oxide as the sole etherifying agent in which at least about 70 percent and preferably all of the phenolic hydroxyl groups originally present in the novolak are etherified with from about 0.7 to 1.2 and preferably at least about 0.8 moles of styrene oxide per phenolic unit. Advantageously, for many purposes, the resinous polyalcohol consists of the etherified product of a phenol-formaldehyde novolak of the indicated type with a mixture of etherifying agents consisting of styrene oxide and a relatively more reactive organic oxide selected from the group of organic epoxides consisting of alkylene oxides containing from 2 to 3 carbon atoms in their molecule; hydroxy alkylene oxides containing from 3 to 5 carbon atoms in their molecule; and aryl glycidyl ethers in which at least about 70 percent and preferably all of the phenolic hydroxyl groups originally present in the novolak are etherified with from about 0.2 to 1.0 moles of styrene oxide and with not more than about 1.0, and advantageously from about 1.0 to 0.2, moles of the relatively more reactive organic oxide per phenolic unit. Preferably the polyalcohol is etherified with about 0.5 mole of styrene oxide and a total of not more than about 1.25 moles of both oxides per phenolic unit.

If desired, the improved synthetic drying oil may consist of mixtures of esterified products of different resinous polyalcohols, one of the polyalcohols being independently etherified solely with styrene oxide and the other being a resinous polyalcohol which may be partially etherified with styrene oxide and with the more reactive oxide or which may be completely etherified with the more reactive organic oxide. In such cases it is advantageous for both of the polyalcohols to be etherified with not more than about 1.25 moles of oxide per phenolic unit and for the proportion of etherified styrene oxide adducts to the sum total of etherified oxide adducts which are present in such a mixture to be between about 25 and 100 mol percent.

Preferably, the resinous polyalcohols which are esterified in the practice of the present invention are prepared from any novolak having the indicated molecular characteristics which is based on formaldehyde and, advantageously, the common phenol, $C_6H_5OH$, regardless of the particular method which is employed for its manufacture. Thus, the novolak may be made under reflux conditions at atmospheric pressure, in the conventional manner, or it may be made at elevated temperatures and pressures, particularly according to the procedure described in the copending applications Serial Nos. 382,851 and 382,852, both filed September 28, 1953, in both of which the present inventor is a coapplicant. The optimum molecular ratio of aldehyde to phenol which may be employed in manufacturing the novolaks varies somewhat with the particular method which is utilized. Generally the ratio falls between about 0.65 and 0.95 mole of aldehyde per mole of phenol with greater advantages being frequently obtainable when the ratio is between about 0.75 and 0.85. Usually the novolaks may be prepared by condensing the aldehyde and phenol in the presence of an acid catalyst, such as phosphoric oxalic, hydrochloric or sulfuric acids. Sometimes, however, useful products may be obtained from alkali-catalyzed condensations.

Novolaks prepared from the common phenol, $C_6H_5OH$, may generally be employed with greater advantage for reasons of economy and availability and also because of the difficulties, due to steric hindrance, which may be encountered when novolaks from certain substituted phenols are employed and attempted to be etherified with styrene oxide. As will be illustrated, novolaks prepared from certain substituted phenols are not as advantageously employed. However, novolaks having minor amounts of substituted phenols present in the condensed product may sometimes be employed. In such novolaks the phenol substituents are not available in such relative configurations and proportions as might give rise to insurmountable steric obstructions to the desired reaction with styrene oxide.

As has been indicated, the resinous, styrene oxide-containing polyalcohol adducts which are esterified to provide the improved drying oils of the present invention may advantageously be made by an alkaline catalyzed reaction of the novolak with styrene oxide being employed as the sole etherifying agent or they may be made with combinations of etherifying agents consisting of styrene oxide and a relatively more reactive organic oxide selected from the group of organic epoxides consisting of alkylene oxides containing from 2 to 4 carbon atoms in their molecule; hydroxy alkylene oxides containing from 3 to 5 carbon atoms in their molecule; and aryl glycidyl ethers. Preferably the more reactive oxide is ethylene oxide, propylene oxide or phenyl glycidyl ether. Advantageously, as mentioned, the polyalcohol has at least about 70 percent, and, more advantageously, has substantially all, of the phenolic hydroxyl groups originally present in the novolak etherified by the oxide or oxides employed.

Generally, when superior results are desired, particularly with respect to the caustic resistance of films formed from the esterified polyalcohol adducts, the polyalcohol may be etherified with not more than a total of about 1.25 moles of both oxides per phenolic unit in which most of the etherifying oxide is styrene oxide. However, in many cases, suitable and more economical films may be obtained when lesser amounts of styrene oxide are employed, especially if outstanding caustic resistance in the film is not an essential requirement. Ordinarily the partial etherification of the novolak with ethylene oxide or another more reactive oxide produces a resinous polyalcohol having a relatively lower hydroxyl equivalent weight than when styrene oxide is the sole or predominant etherifying agent. This facilitates the esterification of the polyalcohol by allowing greater amounts of the fatty acids to be employed in completing the esterification and may be advantageous whenever an unusually great caustic resistance is not required. Usually, relatively more rugged and chemically inert coatings may be obtained when ethylene oxide is employed as the more reactive oxide in the resinous polyalcohol. Polyalcohols etherified with styrene oxide alone may advantageously be in accordance with the disclosure contained in the copending application of Alexander M. Partansky and Paul G. Schrader, Serial No. 561,684, concurrently filed January 26, 1956. Polyalcohols which are partially etherified with styrene oxide and then finished with a more reactive oxide may advantageously be in accordance with the disclosure contained in the copending application of the same inventors having Serial No. 561,683, concurrently filed January 26, 1956.

Improved synthetic drying oils in accordance with the present invention may be obtained by cooking or heating the resinous polyalcohols having the described characteristics with drying oil fatty acids at temperatures in the neighborhood of about 235–240° C. The amount of acid used should be enough to yield an oil soluble ester. This result may be obtained by esterifying as little as 0.2 of the hydroxyl groups which are available in the resinous polyalcohol. However, the amount of acid may be enough to esterify substantially all of the hydroxyl groups. Frequently, films having improved caustic resistance may be obtained by employing relatively less fatty acids for esterification, as when between about 0.4 and 0.6 carboxy groups, i.e., in the neighborhood of about 0.5 carboxy groups, are provided by the oil fatty acid per alcoholic hydroxyl present in the polyalcohol. The preponderant proportion of the acids should be those monomeric acids which may be obtained by saponification of drying oils or semi-drying oils. Relatively small amounts of dicarboxylic acids or their anhydrides, such as phthalic acid or its isomers, succinic acid, or maleic anhydride, or dimeric drying oil acids, may be added to the ester-producing cook to effect part of the esterification and to increase the viscosity of the product. Such materials should not be in excess of about 40 percent of the carboxyl values present. They generally will not represent more than about 20 percent of the number of esterifying carboxyl groups present in the total amount of acids used. If their use is especially desirable for any particular reason, it is frequently preferably to employ them in an amount which constitutes less than about 10 percent of the total carboxylic groups employed.

The esterification of the polyalcohols described proceeds in rapid fashion. Generally, acid numbers less than 10 or 15 are obtained within cooking periods of from about 2 to 10 hours, although certain exceptions may occur. In certain instances, as, for example, when an excessive build up of viscosity is encountered and yet a low acid number is desired in the finished composition, it may be advantageous to terminate the esterification towards the end of the reaction by adding a relatively fast reacting polyhydroxy compound, such as glycerol or other glycols and the like or even a relatively more reactive polyalcohol adduct which has been essentially etherified, for example, with ethylene oxide, in order to react with any of the unreacted acid that may be present. This facilitates obtaining a lower, more desirable, residual acid content in the ester oil product and causes no apparent adverse effect on the film coatings obtained from such products. As a matter of fact, such technique conveniently provides a means for "extending" the drying esters with other components of conventional oleoresinous vehicles.

Because of the stability of the improved synthetic drying oils of the present invention, and their freedom from tendencies to form gels, the ester product can often be safely cooked for longer periods of time if it is desired to effect some heat bodying after substantial completion of the esterification. The time-viscosity curve which is obtainable from measurements of the viscosity of the esterifying product during the period of its cooking, does not ordinarily turn sharply toward a position parallel to the viscosity axis, as in the case of materials which tend to gel during cooking. This feature is of salient importance in varnish making, since it permits greater latitude in the preparation of the product.

As indicated, satisfactory oils can also be obtained by mixing or blending separately prepared ester products to a desired composition. Alternatively, they can be obtained, as will be illustrated, by esterifying suitable mixtures of "pure" or different polyalcohols, as, for example, a mixture of a styrene-oxide etherified resinous polyalcohol and an ethylene or propylene or other desired oxide etherified polyalcohol, in which styrene oxide may or may not have been employed for the etherification. When this is practiced, it is advantageous for both of the polyalcohols to be etherified with not more than about 1.25 moles of oxide per phenolic unit and for the proportion of etherified styrene oxide adducts to the sum total of etherified oxide adducts which are present in the esterified product to be between about 25 and 100 mol percent.

The ester products may be employed without modification as clear, varnish-like protective coatings having unusually good caustic resistance and other desirable characteristics. Or they may be blended or cooked with such standard coating constituents as drying oils and alkyl phenolic or other type resins. If desired, they may be prepared as pigmented compositions to prepare coatings having desired colorations. Conventional driers may advantageously be employed to accelerate their drying. The compositions provide useful coatings either when they are air-dried or baked on desired surfaces.

The practice of the present invention is illustrated in and by the following examples.

EXAMPLE I

A novolak was prepared from common phenol with about 0.82 mole of formaldehyde per mole of phenol in the presence of about 0.7 percent by weight of sulfuric acid, based on the weight of the phenol, and water in an amount by weight equal to the amount of phenol. The reaction was conducted in a Pfaudler reactor at elevated temperatures and pressures according to the procedure set forth in copending application Serial No. 382,852, filed September 28, 1953. After being neutralized, purified and dried, about 500 grams of the novolak was dissolved in about 250 grams of dioxane to which was added about 10 grams of an aqueous solution of caustic soda containing about 50 percent by weight of NaOH. The mixture was placed in a high pressure, rocking-type laboratory reactor and slowly heated until a steady temperature of about 115° C. was attained. At this point, about 625 grams of styrene oxide, which constituted about 1.1 moles of the oxide per hydroxyl equivalent of the novolak, was added. The reactants were maintained at a temperature between about 110 and 120° C. while being heated for a period of about 65 hours, after which the reaction mass was cooled, neutralized with citric acid, devolatilized to free the polyalcohol from solvent and unreacted styrene oxide, washed with hot water and dried. There was obtained a practically quantitative yield consisting of about 1076 grams of a resinous polyalcohol having a molecular weight of about 1455 and an equivalent weight of about 225 grams per alcoholic hydroxyl group. This is the exact theoretical value and indicates that a 100 percent etherification had occurred without by-product formation.

An ester was prepared with the polyalcohol by cooking together about 198 grams of the polyalcohol and about 126 grams of linseed oil fatty acids under a nitrogen atmosphere for about 6.5 hours at about 230° C. The amount of oil fatty acid used was 0.8 of the amount theoretically equivalent to the alcohol groups in the polyalcohol. The residual acid number of the cooked mass was found to be about 9.6 and the viscosity of a 70 percent solution of the ester in xylene (at room temperature) was about 1400 centipoises. The numerical color rating of the 70 percent xylene solution was about 14 on the Gardner color scale. Films of this ester dried rapidly in air to give tough, lightly colored coatings having a color, when dried, of about 2 on the Gardner scale. The air dried coatings, which had a Sward Rocker hardness value of about 22, remained strong and intact after 7 days exposure to a 2 percent by weight aqueous solution of caustic soda. A film of the ester, baked for 30 minutes at 150° C. (hardness 24), remained clear, strong and tough after 2 weeks of the same exposure. Similar results were obtained with esters prepared from the polyalcohol and soya oil fatty acids.

EXAMPLE II

A novolak having a molecular weight of about 800 was prepared in a pressure vessel by reacting, at 150° C. for one hour, about 8235 grams of common phenol with about 5900 grams of formalin (to provide an aldehyde to phenol ratio of about 0.82) in the presence of about 8590 milliliters of supplementary water and about 82.4 grams of phosphoric acid containing about 85 percent by weight of $H_3PO_4$. After being reacted, the novolak-containing mass was cooled to about 80° C., neutralized with caustic solution, washed four times with water and devolatilized. About 5200 grams of the novolak, dissolved in about 5000 grams of dioxane, was placed in a pressure reactor, into which was then added about 150 grams of a 50 percent aqueous solution of potassium hydroxide (about 1.45 percent by weight, based on the weight of the novolak) and about 6830 grams of styrene oxide, which constituted about 1.15 moles of the oxide per hydroxyl equivalent of the novolak. The reaction mass was maintained at a temperature of about 115° C. for a reaction period of about 36 hours. It was then cooled to about 80° C. and neutralized with citric acid. The dioxane solvent and unreacted styrene oxide were removed by distillation, after which the remaining polyalcohol was separately washed four times with hot water and dried under a vacuum. The cryoscopic molecular weight of the polyalcohol was found to be 1400 and it had an hydroxyl equivalent weight of about 230 and a melting point of about 94° C.

Esters prepared in a similar manner to that set forth in Example I with various oil fatty acids provided excellent caustic resistant films having properties, which were determined in the conventional manner described in Example VI, as indicated in the following table. The table also includes details relating to the preparation of each film.

*Table 1*

| Fatty acid ester | Weight of polyalcohol, gms. | Oil fatty acids charged ||||| Cooking schedule: temp. ° C., and time, hrs. | Final acid number of ester | Viscosity of ester in 70 percent xylene solution, cps. | Tack-free drying time in air, hrs. | Gardner color of dried film | Sward hardness || Caustic resistance, 2% aq. soln. ||
|---|---|---|---|---|---|---|---|---|---|---|---|---|---|---|
| | | Type of oil fatty acid | Weight of oil, gms. | Percent by weight of oil in charge | Mols. oil per alcoholic equiv. weight of polyalcohol | | | | | | | Air dried | Baked 30 min., 50° C. | Air dried | Baked 30 min., 150° C. |
| A | 109 | Soya | 91 | 45.5 | 0.7 | 240°/6.0 | 10.7 | 1,400 | 1.16 | 5 | 27 | 20 | 7 to 14 days | >14 days |
| B | 180.5 | Linseed | 169.5 | 48.5 | 0.8 | 240°/2.8 | 21.0 | 630 | 1.25 | 3 | 31 | 45 | do | >28 days |
| C | 220.5 | do | 129.5 | 37.0 | 0.5 | 240°/2.8 | 9.9 | 6,000 | 0.66 | 4 | 48 | 48 | 7 to 28 days | >10 wks. |
| D | 180.5 | Linseed and glycerol. | 169.5 and 2.1. | 48.5 and 0.6. | 0.8 and 0.1. | 240°/3.0 and 240°/2.0. | 18.9 and 10.6. | 870 and 2,270. | 1.00 | 4 | 32 | 31 | 1 to 7 days. | >10 wks. |

NOTE.—Glycerol was added after 3 hrs. of esterification with linseed oil fatty acid to react with remaining unreacted fatty acid in order for a low acid number to be obtained without an excessive viscosity build up.

EXAMPLE III

A novolak was prepared from common phenol with about 0.82 mole of formaldehyde per mole of phenol in the presence of about 1.0 percent of phosphoric acid, based on the weight of the phenol, and water in an amount by weight about one and one-half times the amount of the phenol. The reaction was conducted in a Pfaudler reactor at elevated temperatures and pressures according to the procedure set forth in Example I. After being neutralized, purified and dried, about 500 grams of the novolak was dissolved in about 500 grams of dioxane to which was added about 14.5 grams of an alcoholic solution of potassium hydroxide containing about 2.5 grams of KOH. The mixture was placed in a high pressure, rocking-type laboratory reactor wherein about 404 grams of styrene oxide, which constituted about 0.71 mole of the oxide per hydroxyl equivalent of the novolak, was added. The mixture was heated for 40 hours at a temperature in the neighborhood of 110–115° C. At the end of this initial period of the reaction, the temperature was raised to 150° C. and about 85 grams of ethylene oxide, constituting about 0.40 mole per novolak equivalent, was added. Heating was continued at a temperature of about 155° C. for an additional five hour period, after which the reaction mass was cooled, neutralized with citric acid, devolatilized to free the polyalcohol from solvent and then washed with water. There was obtained a resinous polyalcohol having a molecular weight of about 990 and an equivalent weight of about 214 grams per alcoholic hydroxyl group.

An ester was prepared with the polyalcohol by cooking together about 129 grams of the polyalcohol with about 121 grams of soya oil fatty acids under a nitrogen atmosphere for about 7.5 hours at about 230° C. The amount of oil fatty acid used was about 0.7 of the amount theoretically equivalent to the alcohol groups in the polyalcohol. The residual acid number of the cooked mass was found to be about 7.7 and the viscosity of a 70 percent solution of the ester in xylene (at room temperature) was about 1000 centipoises. The color of the 70 percent xylene solution was about 13 on the Gardner color scale. Films of this ester dried in air to give tough, lightly colored coatings having a Sward Rocker hardness, when dried, of about 22 and color of about 3 on the Gardner scale. The air dried coatings had good resistance to a 2 percent by weight aqueous solution of caustic soda. The film withstood seven days immersion in such a solution before it disintegrated. A film of the ester, baked for 30 minutes at 150° C., having a Sward hardness of 24, remained clear, strong and tough after 2 weeks of the same exposure.

EXAMPLE IV

When the procedure of Example III was repeated excepting that 1.0 mole of styrene oxide per novolak hydroxyl equivalent was reacted for a 24 hour period at a temperature of about 120° C. and about 0.1 mole of the ethylene oxide per novolak hydroxyl equivalent was reacted for 3 additional hours at about 140° C. and 1.0 percent by weight of the potassium hydroxide catalyst, based on the weight of the novolak, was employed, there was obtained a polyalcohol product having a molecular weight of about 1290 and a hydroxyl equivalent weight of about 268 grams. Similar results to those of Example I were obtained with film coatings consisting of soya oil fatty acid esters of the polyalcohol.

EXAMPLE V

The procedure set forth in Example III was identically repeated excepting that the initial addition of styrene oxide was only about 202 grams (0.35 mole per hydroxyl equivalent weight of the novolak) and the heating was conducted in the neighborhood of 110–115° C. for about 48 hours. Propylene oxide was employed as the etherification-completing alkylene oxide. It was added in an amount of about 209 grams, which constituted about 0.75 mole of propylene oxide per hydroxyl equivalent weight of the novolak. The hard, brittle resinous polyalcohol obtained had a cryoscopic molecular weight of about 1180 and a hydroxyl equivalent weight of 193. The yield which was obtained of this polyalcohol was in the amount of about 863 grams.

An ester was prepared by heating about 122 grams of the polyalcohol together with 128 grams of soya oil fatty acids for 8.75 hours at 235° in an inert atmosphere. About 0.7 of the theoretical amount of fatty acid was employed. After being cooked, the esterified mass had an acid number of 11.7 and a viscosity of about 1600 centipoises, when dissolved in xylene to obtain a 70 percent by weight solution. The color of the xylene solution was 13 on the Gardner scale. Air dried and baked coatings of the film had about the same hardness and caustic resistance as the film obtained in Example III excepting that the dried film was lighter, having a Gardner color of 2.

EXAMPLE VI

Several resinous polyalcohols were prepared in a manner closely similar to those in the preceding five examples using novolaks from the common phenol. In order to demonstrate by contrast the advantages to be derived from employment of the common phenol, two of the polyalcohols were prepared from substituted phenols. The ortho-phenyl phenol novolak employed for polyalcohol "J" was made according to the general procedure set forth in Example I. A 0.92 aldehyde to phenol ratio was used to prepare the novolak with 1 percent by weight of sodium hydroxide as a catalyst. The solvent used in preparing the ortho-phenyl phenol novolak was comprised of 40 percent by weight of water and an equal amount of ethanol, based on the weight of the phenol. The ortho-phenyl phenol novolak had a molecular weight of about 870 and a melting point of about 128° C. The para-tertiary butyl phenol novolak employed for Polyalcohol "K" was made according to the same procedure, excepting that a 0.90 aldehyde to phenol ratio with 0.5 percent by weight of sulfuric acid catalyst was employed. It had a melting point of about 133° C. and a molecular weight of about 698. It is to be noted that the polyalcohols prepared from substituted phenols were less desirable in several respects in comparison to those from common phenol, particularly with regard to their appreciably lower molecular weights. It should also be observed that the higher etherifying temperatures employed for the novolak-styrene oxide adducts produce less desirable resinous polyalcohols than when an etherifying temperature between about 110 and 130° C. is employed for the styrene oxide adduct. The results are tabulated as follows.

*Table II*

| Polyalcohol | Preparation analogous to example | Novolak | | | Reaction conditions | | | | | Polyalcohol properties | |
|---|---|---|---|---|---|---|---|---|---|---|---|
| | | Type phenol used | Aldehyde or phenol ratio | Mol. weight of novolak | Ratio, moles of styrene oxide per hydroxyl equivalent weight of novolak | Percent by weight of NaOH catalyst based on weight of novolak | Percent by weight of dioxane solvent based on weight of novolak | Heating schedule | | Cryoscopic molecular weight | Hydroxyl equivalent weight (gms.) |
| | | | | | | | | Temp., °C., and time, hrs. | Max. temp., °C., attained during reaction | | |
| E | I | Common | 0.85 | 706 | 1.08 | 0.3 | 67 | 160°/ 5.0 | 230 | 1,275 | 242 |
| F | VI | do | 0.825 | 722 | 1.12 | 0.3 | 50 | 165°/ 6.0 | 190 | 1,202 | 248 |
| G | I | do | 0.80 | 762 | 0.7 | 0.3 | 50 | 160°/ 4.0 | 200 | 1,307 | 281 |
| H | I | do | 0.80 | 762 | 1.1 | 0.3 | 75 | 160°/ 5.5 | 190 | 1,307 | 248 |
| J | I | O-phenyl phenol | 0.92 | 867 | 1.05 | 0.3 | 50 | 160°/ 5.0 | 230 | [1]777 | 344 |
| K | I | P-tert. butylphenol | 0.90 | 698 | 1.05 | 0.3 | 50 | 160°/16.0 | 240 | [1]770 | 303 |

[1] Relatively low molecular weights of polyalcohols from substituted phenols.

Various oil fatty acid esters were made from the polyalcohol adducts included in Table II in a manner of ester preparation analogous to that in the preceding examples. Some of the properties of these ester products are set forth in the following Table III, which also includes details on the preparation of each ester. In several of the preparations glycerol was added near the end of the esterification to react with the remaining unreacted oil fatty acids. In others an addition of an ethylene oxide ether of a novolak from common phenol, prepared according to copending application Serial No. 382,852, containing 1.10 moles of ethylene oxide per phenolic unit and having a molecular weight of about 1270 was reacted with the resinous polyalcohol in the indicated manner. It is also to be noted, particularly in both Tables III and IV (which follows) and in comparison with other portions of the specification, that the esters and the films from esters J1, J2, K1 and K2, which were prepared from the polyalcohols made with substituted phenols, had generally inferior and less desirable properties than those from polyalcohols made with the common phenol.

posure. The percentage of gloss retained after this test was 18 percent by G1 and 27 percent by H1, which is better than is obtainable with most commercial varnishes whose gloss retention after such a test is usually in the neighborhood of 2–10 percent.

Four of the best quality obtainable commercial resin-in-oil spar varnishes, recommended for outdoor use on wood, were tested in comparison with the coatings of ester oils according to the present invention. These are designated in Table IV by the Roman numerals in parentheses.

It is significant that none of the improved synthetic drying oils of the invention were specially compounded or reinforced for test purposes with such materials as resins, pigments, or added oils which might better adapt them for special uses. They were used in an unmodified form. If desired, it is possible to alter the ester oils to adapt them for certain special uses by modifying them according to formulation practices which are conventionally employed in the manufacture of ordinary varnishes.

*Table III*

| Polyalcohol, see Table II | Ester | Weight polyalcohol gms. | Oil fatty acid used and finishing treatment, if any | | | | Cooking schedule, temp., °C., and time, hrs. | Residual acid number | Viscosity of 70 percent xylene sol'n, cps. | Gardner color of 70 percent xylene sol'n |
|---|---|---|---|---|---|---|---|---|---|---|
| | | | Kind | Weight gms. | Weight percent | Equiv. ratio | | | | |
| E | E1 | 100.8 | Linseed | 109.0 | 48.1 | 0.80 | 232°/10.5 | 10.0 | 2,200 | 15 |
| E | E2 | 118 | do | 82.0 | 41.0 | 0.60 | 235°/ 7.33 | 5.4 | 3,000 | 15 |
| E | E3 | 110 | {Linseed | 101 | 47.8 | 0.8 | 240°/ 5.0 | 16.5 | 630 | 13 |
| | | | {Glycerol | 3.0 | 1.5 | 0.1 | 230°/ 3.0 | 2.4 | 1,000 | 15 |
| E | E4 | 110 | {Linseed | 101 | 47.8 | 0.8 | 240°/ 4.0 | 18.4 | 600 | |
| | | | {EtOX-Nov | 15 | 6.6 | 0.1 | 232°/ 5.0 | 3.6 | 4,000 | 15 |
| F | F1 | 115 | {Linseed | 101 | 46.0 | 0.8 | 238°/ 5.0 | 9.0 | 800 | 12 |
| | | | {Glycerol | 3.0 | 1.4 | 0.1 | 235°/ 2.0 | 1.7 | 925 | 13 |
| F | F2 | 115 | {Linseed | 101 | 43.8 | 0.8 | 240°/ 5.0 | 10.0 | 620 | |
| | | | {EtOX-Nov | 15 | 6.5 | 0.1 | 230°/ 5.0 | 2.3 | 3,300 | 14 |
| G | G1 | 125 | Linseed | 99.5 | 44.3 | 0.8 | 235°/ 2.83 | 25.2 | 3,900 | 15 |
| G | G2 | 125 | do | 99.5 | 44.3 | 0.8 | 240°/ 6.0 | 15.0 | ¹ 15,000 | 14 |
| H | H1 | 131.8 | {Linseed | 118.2 | 47.3 | 0.8 | 230°/ 5.5 | 14.8 | 980 | 14 |
| | | | {Glycerol | 1.7 | 0.7 | 0.1 | 230°/ 2.33 | 8.1 | 1,500 | 14 |
| H | H2 | 132 | Linseed | 118 | 47.2 | 0.8 | 235°/ 5.0 | 14.2 | 4,600 | 13 |
| H | H3 | 160.5 | do | 89.5 | 35.8 | 0.5 | 238°/ 5.0 | 9 | 15,000 | 13 |
| H | H4 | 138 | Soya | 112 | 44.8 | 0.7 | 240°/ 5.33 | 12.9 | 11,500 | 13 |
| J | J1 | 151.5 | Linseed | 98.5 | 39.4 | 0.8 | 238°/13.13 | 9.3 | 575 | 18 |
| J | J2 | 178 | do | 72 | 28.8 | 0.5 | 238°/ 5.0 | 6.9 | 3,600 | 18 |
| K | K1 | 144 | do | 106 | 42.4 | 0.8 | 240°/24.0 | 10.5 | 1,900 | 18 |
| K | K2 | 171 | do | 79 | 31.6 | 0.5 | 238°/ 5.75 | 9.2 | 630 | 18 |

¹ Very viscous but no sign of gelation EtOX-Nov. indicates the described ethylene oxide etherified novolak.

Film properties of some of the esters, prepared as indicated in Table III, are detailed in Table IV. The properties of the films were obtained as follows. The films were cast at 3 mils wet thickness on glass slides using 50 percent solutions of the ester in petroleum naphtha. The time required by the film to dry to a tack-free condition and its dried color on the Gardner scale were noted. The hardness of the dried film was determined, either by means of the Sward Rocker test or by the grade of conventional lead pencil which was required to mark the film. Slides carrying the dried coatings were immersed in 2 percent aqueous sodium hydroxide at room temperature while the condition of the film was being periodically noted. Other such coated slides were immersed in cold water for 2 weeks. Similar tests were made to determine the hardness, alkali and water resistance of similarly desposited films of the varnish which were baked at 150° C. for 30 minutes.

In addition to what is included in Table IV, the weather resistance of films from esters G1 and H1 was determined on blocks of vertical grain hemlock carrying 3 coats of the oil film being tested. The coated blocks were exposed at an angle of 45° to the ground, facing south, for 14½ months to the weather at Pittsburg, California. The Glossiness of the coatings was measured and computed in the percent of the value before ex-

EXAMPLE VII

A novolak having a molecular weight of about 800 was prepared in a pressure vessel by reacting, at 150° C. for one hour, about 8235 grams of common phenol with about 5900 grams of 37 percent formalin (to provide an aldehyde to phenol ratio of about 0.82) in the presence of about 8590 milliliters of supplementary water and about 82.4 grams of phosphoric acid containing about 85 percent by weight of $H_3PO_4$. After being reacted, the novolak-containing mass was cooled to about 80° C., neutralized with caustic solution, washed four times with distilled water and devolatilized. About 3395 grams of the novolak, dissolved in about 2500 grams of dioxane, was placed in a pressure reactor. About 34 grams of a 50 percent aqueous solution of potassium hydroxide and about 3880 grams of styrene oxide were then added to the reactor. The reaction mass was maintained at a temperature of about 120° C. for a reaction period of about 24 hours. About 728 grams of phenyl glycidyl ether was then introduced into the reacted mass and heating continued for an additional four hours at a temperature of about 140° C. in order to scavenge the unreacted hydroxyl groups in the already etherified polyalcohol. The reaction mass was then cooled to about 80° C. and neutralized with about 32 grams of citric

Table IV

| Ester | Air dried samples | | | | | Baked 30 min./150° C. | | | Flexibility |
|---|---|---|---|---|---|---|---|---|---|
| | Tack-free time, hrs. | Gardner color of dried film | Hardness | Water soaking | 2 percent NaOH soaking | Hardness | Water soaking | 2 percent NaOH soaking | |
| E3 | 1.75 | 5 | 3H-P | | Very slight—24 hrs.—Hazy OK on hardening. | 7H-P | | 14 days—Hard and clear. | |
| E4 | 1.33 | 5 | 3H-P | | Very slight—48 hrs.—Hazy OK on hardening. | 7H-P | | do | |
| F1 | 1.13 | 4 | 4H-P | | 24 hrs.—Slight haze—Med. hard 48 hrs. hazy and soft. | 7H-P | | do | |
| F2 | 1.0 | 4 | 4H-P | | 48 hrs.—Clear and hard. | 7H-P | | do | |
| H1 | 1.25 | 5 | 3H-P | | 4 days—Med. hard and opaque. | 6H-P | | 4 days—Clear, med. hard—2 mos. same. | |
| H2 | 0.75 | 4 | | 14 days—Tough and strong. | 24 hrs.—Strong and hard—Soft in 2 wks. | 42S | 2 wks.—Strong, hard. | 2 wks.—Clear, strong, hard. | |
| H3 | 0.50 | 4 | 54S | 24 hrs.—Brittle | 24 hrs.—Brittle | 58S | 7 days—Hard and brittle. | 24 hrs.—Clear, strong tough. | |
| H4 | 0.75 | 4 | 34S | 2 wks.—Strong and tough but softer. | 24 hrs.—Clear, hard strong—Softer in 2 wks. | 40S | 2 wks.—Strong, tough. | 2 wks.—Clear, strong tough. | |
| J1 | 0.25 | 7 | 48S | 24 hrs.—Brittle | 24 hrs.—Brittle | 56S | 24 hrs.—Brittle | 24 hrs.—Brittle | No good. |
| J2 | 0.07 | 9 | 56S | No good | do | 78S | do | do | |
| K1 | 1.50 | 3 | 34S | do | 24 hrs.—Brittle and weak. | 38S | do | do | No good. |
| K2 | 1.00 | 3 | 54S | do | 24 hrs.—Soft weak—1 wk. disintegrated. | 60S | do | 24 hrs.—Soft | |
| (I) | 1.07 | | 18S | 2 wks.—Soft and weak. | 2 hrs.—Disintegrated | 30S | 2 wks.—Hard, tough. | 3 hrs.—Disintegrated | |
| (II) | 1.07 | | 43S | 1 wk.—Hazy, strong | 24 hrs.—Cloudy, wk | 46S | do | 7 days—Clear, hard tough. | |
| (III) | 1.07 | | 24S | 2 wks.—Soft clear | 24 hrs.—Weak and soft. | 36S | do | 7 days—Very weak | |
| (IV) | 1.00 | | 16S | do | 3 hrs.—Wrinkled—24 hrs. disintegrated. | 16S | do | 7 days—Very soft | |

P—pencil hardness; S—Sward hardness.

acid. The dioxane solvent was removed by distillation and the remaining polyalcohol was washed with four two-gallon volumes of distilled water and dried under a vacuum. The cryoscopic molecular weight of the polyalcohol was found to be 1490 and it had an hydroxyl equivalent weight of 230.

An ester was prepared by heating about 107 grams of the polyalcohol with about 93 grams of soya oil fatty acids under a nitrogen atmosphere for about 5.3 hours at a temperature of about 240° C. The amount of fatty acid used was 0.7 of the amount theoretically equivalent to the alcohol groups in the polyalcohol. The residual acid number of the prepared mass was found to be about 9.5 and the viscosity of a 70 percent solution of the ester in xylene (at room temperature) was about 1100 centipoises. With addition of conventional metallic driers, a film of the oil, which had been cast on a glass plate to have a thickness of about 3 mils, dried to a tack-free state in air at room temperature within 2.75 hours. The color of the dried film on the Gardner scale was 2. The air dried film had a Sward hardness of about 24. Another film of the ester, baked on a glass plate for 30 minutes at 150° C. had a Sward hardness of about 26. Both films had excellent resistance to caustic alkali solutions.

EXAMPLE VIII

Results similar to those in the foregoing Examples III, IV, V and VII may be obtained when hydroxy propylene oxide is employed as the more reactive organic oxide to complete the etherification of the polyalcohol material following the initial etherification with styrene oxide.

EXAMPLE IX

Various styrene oxide-containing polyalcohols, prepared according to the general procedures set forth in the first seven examples, were obtained under conditions and had properties as are detailed in and by the following table. All of the polyalcohols involved were prepared from a similar novolak condensate as that employed in Example VI.

Table V

| Identification of resin and polyalcohol | Novolak weight, gms. | Dioxane solvent weight, gms. | Catalyst | | | Oxide component | | | Reaction conditions | | Cryoscopic weight, molecular | Hydroxyl weight equivalent, grams | Melting point, °C. |
|---|---|---|---|---|---|---|---|---|---|---|---|---|---|
| | | | Kind | Weight of 50 percent aq. sol. M.l gms. | Percent by weight based on novolak | Kind [1] | Weight of oxides, grams | Ratio, moles oxide equiv. of novolak | Temp., °C., and time, hrs. | Max. temp., °C., attained during reaction | | | |
| L | 7,710 | 3,855 | NaOH | 77.1 | 0.5 | St / Et | 881 / 3,410 | 0.10 / 1.05 | 117°/12.0 / 140°/ 4.75 | 118 / 162 | 1,205 | 161 | 82 |
| N | 7,500 | 4,800 | KOH | 150 | 1.0 | St / Et | 2,150 / 2,680 | 0.25 / 0.85 | 115°/24.0 / 140°/ 5.66 | 116 / 154 | 1,305 | 159 | 88 |
| P | 6,745 | 5,000 | KOH | 140 | 1.04 | St / Et | 3,860 / 1,850 | 0.50 / 0.85 | 115°/24.0 / 140°/ 4.58 | 116 / 157 | 1,330 | 189 | 89 |
| R | 500 | 500 | KOH | 5.0 | 0.5 | St / Et | 404 / 85 | 0.70 / 0.40 | 105°/40.0 / 155°/ 5.75 | | 990 | 214 | |
| S | 5,500 | 5,500 | KOH | 110 | 1.00 | St / Et | 6,280 / 576 | 1.00 / 0.25 | 120°/24.0 / 150°/ 3.33 | | 1,635 | 234 | 95 |

[1] St (styrene oxide), Et (ethylene oxide).

Table VI

| Fatty acid ester | Poly-alcohol (see Table V) | Weight of poly-alcohol, grams | Oil fatty acids charged | | | | Cooking schedule: temp., °C., and time, hrs. | Final acid number of ester | Viscosity of ester in 70 percent xylene solution, cps. P | Time req'd to dry to touch in air | Gardner color of dried film | Sward hardness | | Caustic resistance [1] | |
|---|---|---|---|---|---|---|---|---|---|---|---|---|---|---|---|
| | | | Type of oil fatty acid | Weight of oil, grams | Percent by weight of oil in charge | Moles oil per alcoholic equiv. wt. | | | | | | Air dried | Baked 30 min. at 150° C. | Air dried | Baked 30 min., 150° C. |
| L1 | L | 89 | Soya | 111 | 55.5 | 0.7 | 239°/6.00 | 2.1 | 600 | 1.25 | 1 | 20 | 12 | 1 hr. to 1 da. | 1 hr. to 1 da. |
| N1 | N | 88 | do | 112 | 56.0 | 0.7 | 240°/3.75 | 3.7 | 620 | 0.75 | 2 | 9 | 9 | 1 da. to 7 da. | 1 da. to 7 da. |
| N2 | N | 141.5 | Linseed | 208.5 | 59.5 | 0.8 | 230°/3.00 | 7.0 | 700 | 0.72 | 2 | 16 | 13 | 1 da. to 7 da. | 1 da. to 7 da. |
| N3 | N | 182.5 | do | 167.5 | 48.0 | 0.5 | 240°/1.25 | 4.9 | 2,300 | 0.67 | 3 | 27 | 43 | 1 da. to 7 da. | 1 da. to 7 da. |
| P1 | P | 160 | do | 190 | 54.3 | 0.8 | 240°/2.83 | 11.0 | 2,400 | 1.83 | 2 | 29 | 25 | 1 da. to 7 da. | 11 da. to 14 da. |
| P2 | P | 687 | do | 513 | 42.7 | 0.6 | 240°/2.18 | 6.3 | 4,000 | 0.83 | 3 | 40 | 42 | 1 da. to 7 da. | 21 da. to 28 da. |
| R1 | R | 129 | Soya | 121 | 48.4 | 0.7 | 230°/7.50 | 7.7 | 1,000 | 4.50 | 3 | 22 | 24 | 1 da. to 7 da. | >14 da. |
| S1 | S | 107.5 | do | 92.5 | 46.3 | 0.7 | 240°/3.00 | 0.6 | 3,000 | 2.67 | 4 | 28 | 31 | 1 da. to 7 da. | 7 da. to 14 da. |

[1] Hr.—hours, da.—days.

Various oil fatty acid esters made from the polyalcohols prepared as set forth in Table V provided excellent caustic resistant films. This is indicated in the above table, which also includes details relating to the preparation of each film.

EXAMPLE X

Various synthetic drying oils were prepared by blending, in differing proportions, an ester of a polyalcohol etherified solely with styrene oxide (the polyalcohol being similar to that obtained in Example II) and a 0.5 mole linseed oil fatty acid ester of a similarly prepared polyalcohol excepting that it was etherified solely with ethylene oxide to contain about 1.0 mole of the reacted oxide per phenolic unit in the novolak. Before being esterified, it had a melting point of about 64° C., a molecular weight of about 1253, and an equivalent weight of 152 grams per alcoholic hydroxyl. Details on the preparation of the mixtures and their film properties are given in the following Table VII, which includes the transient color changes of the films on the Gardner color scale from their applied to their dried conditions. An exposure of 25 to 30 hours in a standard Fadeometer testing apparatus was utilized to determine the exposure color changes of the films as measured by a Photovolt instrument using a white tile as standard. The color changes in the Fadeometer test generally occurred within the first few hours of exposure after which no further appreciable change in color was observed during testing for additional periods of as long as several weeks.

Table VIII

| Ester | X | Y | Z |
|---|---|---|---|
| Weight percent of polyalcohol etherified with EtOx in oil | 8.0 | 21.9 | 38.2 |
| Weight percent of polyalcohol etherified with StOx in oil | 53.0 | 36.0 | 15.7 |
| Weight percent linseed oil fatty acid in oil | 39.0 | 42.2 | 46.1 |
| Mol ratio of etherified EtOx groups in oil | 0.2 | 0.5 | 0.8 |
| Mol ratio of etherified StOx groups in oil | 0.8 | 0.5 | 0.2 |
| Ratio of equiv. of linseed oil fatty acid per available alcoholic hydroxyl in polyalcohol | 0.5 | 0.5 | 0.5 |
| Final acid number | 7.1 | 4.0 | 1.5 |
| Final viscosity of 70 percent xylene sol'n, cps | 2,400 | 2,700 | 1,800 |
| Tack-free time, minutes | 40 | 40 | 45 |
| Gardner color change of drying film | 1-6-3 | 1-4-3 | 1-3-2 |
| Initial Fadeometer color air dried film | 83 | 89 | 92 |
| Final Fadeometer color air dried film | 71 | 77 | 78 |
| Initial Fadeometer color baked film | 65 | 68 | 78 |
| Final Fadeometer color baked film | 75 | 75 | 79 |
| Sward hardness, air dried film | 42 | 38 | 33 |
| Sward hardness, baked film | 33 | 27 | 21 |
| 3 percent aq. NaOH resistance of air dried film | 2-5 days | 1 day | 1 day |
| 3 percent aq. NaOH resistance of baked film | Unaffected after 12 days | Unaffected after 12 days | 5-8 days |

NOTE.—StOx—styrene oxide etherified novolak, EtOx—ethylene oxide etherified novolak.

Table VII

| Ester mixture | Ratio of equiv. of StOx:EtOx in esterfied adducts | Composition by wt. percent of oils | | Tack-free time, minutes | Gardner color change in oil film on drying: applied-drying-dried | Fadeometer exposure color change | | | | Sward hardness | | Caustic resistance, 3 percent NaOH sol'n | |
|---|---|---|---|---|---|---|---|---|---|---|---|---|---|
| | | StOx oil | EtOx oil | | | Air Dry | | Baked | | Air dry | Baked | Air dry | Baked (30 min. at 150° C.) |
| | | | | | | Initial | Final | Initial | Final | | | | |
| MA | 100:00 | 100 | 0 | 25 | 2-5-5 | 88 | 75 | 63 | 72 | 50 | 45 | Unaffected | Unaffected |
| MB | 80:20 | 84.2 | 15.8 | 35 | 2-5-5 | 88 | 75 | 68 | 75 | 40 | 37 | 2-5 days | Do. |
| MC | 65:35 | 71.1 | 28.9 | 36 | 2-5-5 | 88 | 75 | 72 | 76 | 37 | 33 | 4 days | Do. |
| MD | 50:50 | 57.0 | 43.0 | 45 | 2-5-4 | 90 | 76 | 73 | 76 | 37 | 28 | Less than 1 day | Do. |
| ME | 35:65 | 41.8 | 58.2 | 60 | 2-5-3 | 91 | 75 | 74 | 76 | 30 | 24 | do | 5-8 days. |
| MF | 20:80 | 24.9 | 75.1 | 60 | 1-4-2 | 93 | 78 | 75 | 78 | 28 | 23 | do | 4-5 days. |
| MG | 10:90 | 12.9 | 87.1 | 60 | 1-3-2 | 93 | 77 | 77 | 76 | 25 | 18 | 1 day | 2-4 days. |
| MH | 0:100 | 0 | 100 | 60 | 1-1-1 | 95 | 77 | 79 | 78 | 26 | 13 | do | 1-3 days. |

StOx—styrene oxide etherified novolak ester.
EtOx—ethylene oxide etherified novolak ester.

EXAMPLE XI

Various ester oils were prepared according to the general procedure of the foregoing examples by esterifying mixtures of the styrene oxide etherified polyalcohol and an ethylene oxide etherified polyalcohol each of the polyalcohols was similar to those employed in the ester oils of Example VIII. Details on the preparation of the esters and on their film properties are included in the following Table VIII. All of the tests were made in accordance with details of the preceding examples.

Since certain changes and modifications can be readily entered into in the practice of the present invention without substantially departing from its intended spirit and scope, it is to be fully understood that all of the foregoing description and specification be interpreted as being merely illustrative of preferred embodiments of the invention which is not to be construed as being limited or restricted thereby excepting as it is set forth and defined in the appended claims.

What is claimed is:

1. An esterification product of (1) a resinous polyalcohol consisting of the etherified product of a phenol-formaldehyde novolak which is the reaction product of phenol and formaldehyde and which has from three to ten phenolic units per molecule in which at least about 70 percent of the phenolic hydroxide groups originally present in the molecule are etherified with from 0.2 to 1.2 moles per each phenolic unit of styrene oxide and (2) carboxylic acids in an amount to provide at least about 0.2 to 1.0 carboxyl groups per alcoholic hydroxyl of said resinous polyalcohol, at least about 60 percent of the carboxyl groups being furnished by fatty acids having drying characteristics said fatty acids being monomeric acids selected from the group consisting of those obtained by saponification of drying oils, semi-drying oils, and mixtures thereof.

2. The product of claim 1 wherein substantially all of the phenolic hydroxide groups originally present in the novolak molecule are etherified with styrene oxide.

3. An esterification product of (1) a resinous polyalcohol consisting of the etherified product of (a) a phenol-formaldehyde novolak which is the reaction product of phenol and formaldehyde and which has from three to ten phenolic units per molecule with (b) from 0.7 to 1.2 moles per each phenolic unit of styrene oxide and with (c) not more than about 1.0 mole per each phenolic unit of a relatively more reactive organic oxide selected from the group of organic epoxides consisting of alkylene oxides containing from 2 to 4 carbon atoms in their molecule; hydroxy alkylene oxides containing from 3 to 5 carbon atoms in their molecule; and aryl glycidyl ethers, in which etherified product at least about 70 percent of the phenolic hydroxy groups originally present in the novolak are etherified and (2) carboxylic acids in an amount to provide at least about 0.2 to 1.0 carboxyl of said resinous polyalcohol, at least about 60 percent of the carboxyl groups being furnished by fatty acids having drying characteristics said fatty acids being monomeric acids selected from the group consisting of those obtained by saponification of drying oils, semi-drying oils, and mixtures thereof.

4. The product of claim 3 wherein substantially all of the phenolic hydroxide groups originally present in the novolak molecule are etherified with at least about 0.8 mole of styrene oxide per phenolic unit.

5. The product of claim 3 wherein the polyalcohol has not more than about 0.5 mole of styrene oxide and a total of not more than about 1.25 moles of both oxides per phenolic unit and in which substantially all of the phenolic hydroxyl groups originally present in the novolak are etherified.

6. The product of claim 3 wherein the relatively more reactive organic oxide is ethylene oxide.

7. The product of claim 3 wherein the relatively more reactive oxide is phenyl glycidyl ether.

8. The product of claim 3 wherein essentially all of the esterifying acids have drying characteristics.

9. The product of claim 3 wherein the amount of carboxylic acids used in the esterification reaction provides in the neighborhood of about 0.5 carboxyl groups per alcoholic hydroxyl of the resinous polyalcohol.

10. An esterification product of (1) a mixture of resinous polyalcohols consisting of the etherified product of (a) a phenol-formaldehyde novolak which is the reaction product of phenol and formaldehyde and which has from three to ten phenolic units per molecule with (b) from 0.7 to 1.2 moles per each phenolic unit of styrene oxide in which at least about 70 percent of the phenolic hydroxy groups originally present in the novolak are etherified and the etherified product of a (c) novolak which is the reaction product of phenol and formaldehyde and which has from three to ten phenolic units per molecule with (d) not more than about 1.25 moles of a relatively more reactive organic oxide selected from the group of organic epoxides consisting of alkylene oxides containing from 2 to 4 carbon atoms in their molecule; hydroxy alkylene oxides containing from 3 to 5 carbon atoms in their molecule and aryl glycidyl ethers in which at least about 70 percent of the phenolic hydroxy groups originally present in the novolak are etherified and (2) carboxylic acids in an amount to provide between about 0.2 and 1.0 carboxyl groups per alcoholic hydroxide of said resinous polyalcohols, at least about 60 percent of the carboxyl groups being furnished by fatty acids having drying characteristics said fatty acids being monomeric acids selected from the group consisting of those obtained by saponification of drying oils, semi-drying oils, and mixtures thereof, wherein the proportion of etherified styrene oxide adducts the sum total of etherified oxide adducts which are present in the esterified product is between about 25 and 100 mol percent.

11. The product of claim 10 wherein the carboxylic acids are in an amount to provide in the neighborhood of about 0.5 carboxyl groups per alcoholic hydroxide of said resinous polyalcohols.

12. The product of claim 10 wherein the relatively more reactive organic oxide is ethylene oxide.

13. An esterification product consisting of a mixture of (1) an esterification product of (a) a resinous polyalcohol consisting of the etherified product of a phenol-formaldehyde novolak which is the reaction product of phenol and formaldehyde and which has from three to ten phenolic units per molecule with from 0.7 to 1.2 moles of styrene oxide per each phenolic unit in which at least about 70 percent of the phenolic hydroxy groups of originally present in the novolak are etherified and (b) carboxylic acids in an amount to provide between about 0.2 and 1.0 carboxyl groups per alcoholic hydroxide of said styrene oxide-etherified resinous polyalcohol, at least about 60 percent of the carboxyl groups being furnished by fatty acids having drying characteristics said fatty acids being monomeric acids selected from the group consisting of those obtained by saponification of drying oils, semi-drying oils, and mixtures thereof and (2) an esterification product of (c) a resinous polyalcohol consisting of the etherified product of a novolak which is the reaction product of phenol and formaldehyde and which has from three to ten phenolic units per molecule with not more than about 1.25 moles of ethylene oxide per each phenolic unit in which at least about 70 percent of the phenolic hydroxy groups originally present in the novolak are etherified and (d) carboxylic acids in an amount to provide between about 0.2 and 1.0 carboxyl groups per alcoholic hydroxide of said ethylene oxide-etherified resinous polyalcohol, at least about 60 percent of the carboxyl groups being furnished by fatty acids having drying characteristics, said fatty acids being monomeric acids selected from the group consisting of those obtained by saponification of drying oils, semi-drying oils, and mixtures thereof, wherein the proportion of etherified styrene oxide adducts to the sum total of etherified oxide adducts which are present in such a mixture is between about 25 and 100, mol percent.

14. The product of claim 13 wherein the carboxylic acids are in an amount to provide in the neighborhood of about 0.5 carboxyl groups per alcoholic hydroxide of each resinous polyalcohol.

References Cited in the file of this patent

UNITED STATES PATENTS

| | | |
|---|---|---|
| 2,422,637 | Thomas | June 17, 1947 |
| 2,499,365 | De Groote et al. | Mar. 7, 1950 |
| 2,581,379 | De Groote et al. | Jan. 8, 1952 |
| 2,695,894 | D'Alelio | Nov. 30, 1954 |